(12) United States Patent
Quazi

(10) Patent No.: US 10,143,144 B2
(45) Date of Patent: Dec. 4, 2018

(54) DAISY CHAIN GROW LIGHT

(71) Applicant: Boulder Lamp, Inc., Lafayette, CO (US)

(72) Inventor: Fazle Quazi, Boulder, CO (US)

( * ) Notice: Subject to any disclaimer, the term of this patent is extended or adjusted under 35 U.S.C. 154(b) by 264 days.

(21) Appl. No.: 15/186,724

(22) Filed: Jun. 20, 2016

(65) Prior Publication Data

US 2016/0374273 A1 Dec. 29, 2016

Related U.S. Application Data

(60) Provisional application No. 62/184,564, filed on Jun. 25, 2015, provisional application No. 62/219,822, filed on Sep. 17, 2015.

(51) Int. Cl.

| A01G 7/04 | (2006.01) |
|---|---|
| H05B 37/02 | (2006.01) |
| F21S 8/06 | (2006.01) |
| F21V 23/00 | (2015.01) |
| H05B 33/08 | (2006.01) |
| F21Y 115/10 | (2016.01) |
| F21Y 113/10 | (2016.01) |
| F21Y 113/20 | (2016.01) |
| F21V 7/00 | (2006.01) |
| F21V 7/04 | (2006.01) |
| F21Y 103/00 | (2016.01) |
| F21Y 105/10 | (2016.01) |

(52) U.S. Cl.
CPC ............... A01G 7/045 (2013.01); F21S 8/061 (2013.01); F21V 23/008 (2013.01); H05B 33/0803 (2013.01); H05B 33/0857 (2013.01); H05B 37/0272 (2013.01); F21V 7/005 (2013.01); F21V 7/048 (2013.01); F21Y 2103/00 (2013.01); F21Y 2105/10 (2016.08); F21Y 2113/10 (2016.08); F21Y 2113/20 (2016.08); F21Y 2115/10 (2016.08); H05B 33/089 (2013.01); Y02P 60/149 (2015.11)

(58) Field of Classification Search
CPC .......... A01G 7/045; F21S 8/061; F21V 7/005; F21V 7/048; F21V 23/008; F21Y 2103/00; F21Y 2105/10; F21Y 2113/10; F21Y 2113/20; F21Y 2115/10; H05B 37/0272; H05B 33/0857; H05B 33/0803; H05B 33/089; Y02P 60/149

See application file for complete search history.

(56) References Cited

U.S. PATENT DOCUMENTS

| 7,812,543 B2 * | 10/2010 | Budike, Jr. | H05B 37/0272 |
| | | | 315/157 |
| 8,338,801 B2 * | 12/2012 | Ishiwata | A01G 7/045 |
| | | | 250/492.1 |
| 2005/0005529 A1 * | 1/2005 | Brault | A01G 7/045 |
| | | | 52/63 |

* cited by examiner

*Primary Examiner* — Stephen F Husar
(74) *Attorney, Agent, or Firm* — Patent Law Offices of Rick Martin, P.C.

(57) ABSTRACT

An improved ceramic discharge (hanging) lamp is designed for growing plants. A top mounted quick disconnect ballast provides maximum reflection area around the bulb. This also provides a quick disconnect for maintenance. Multiple ballasts can be daisy chained from one high voltage receptacle. An augmented LED or other light source can be attached to a lower frame or to the top frame to provide added light colors at various growth stages. A controller can vary the cycle times of each augmented light panel. The primary reflector maximizes the efficiency of the bulb.

20 Claims, 17 Drawing Sheets

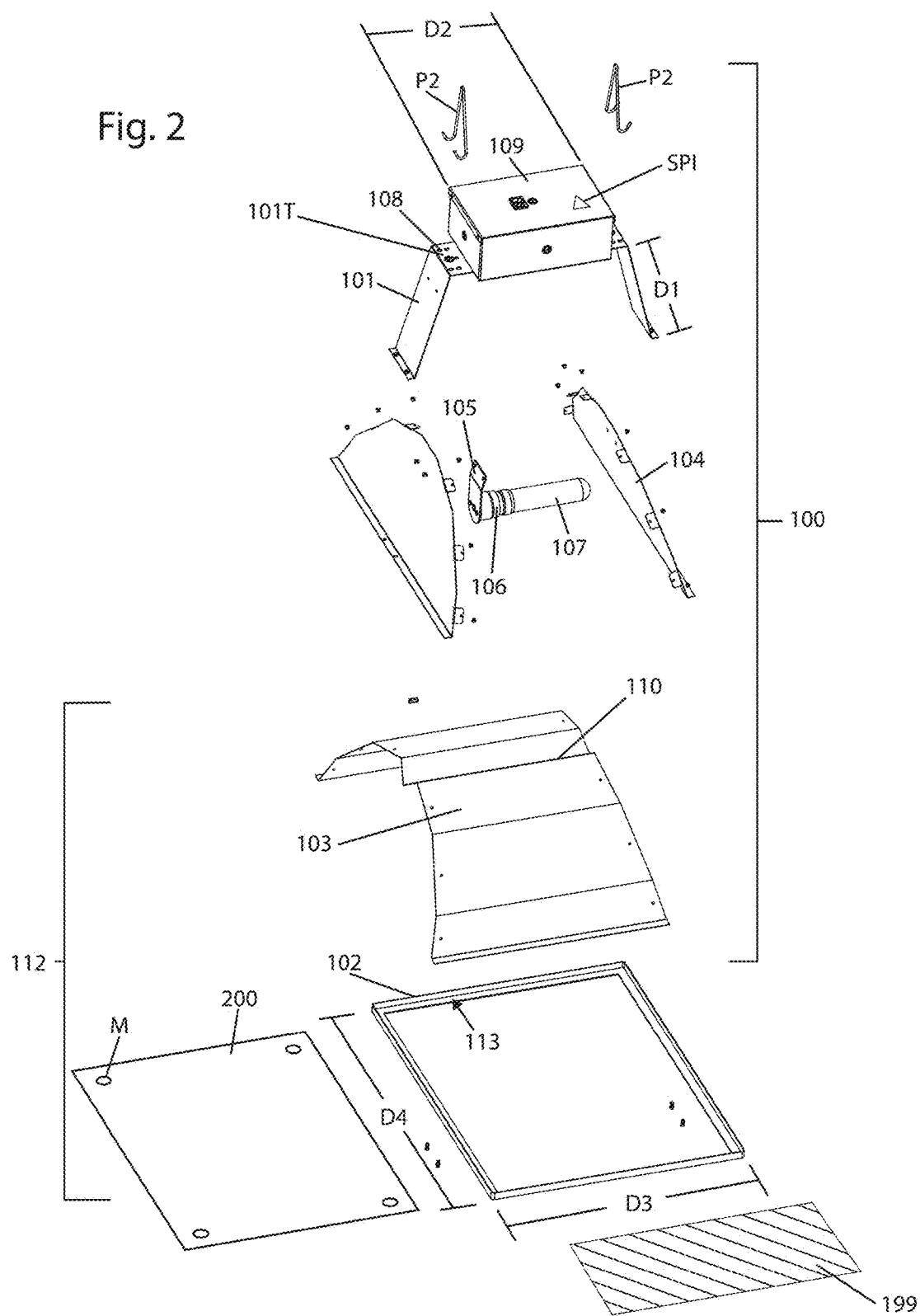

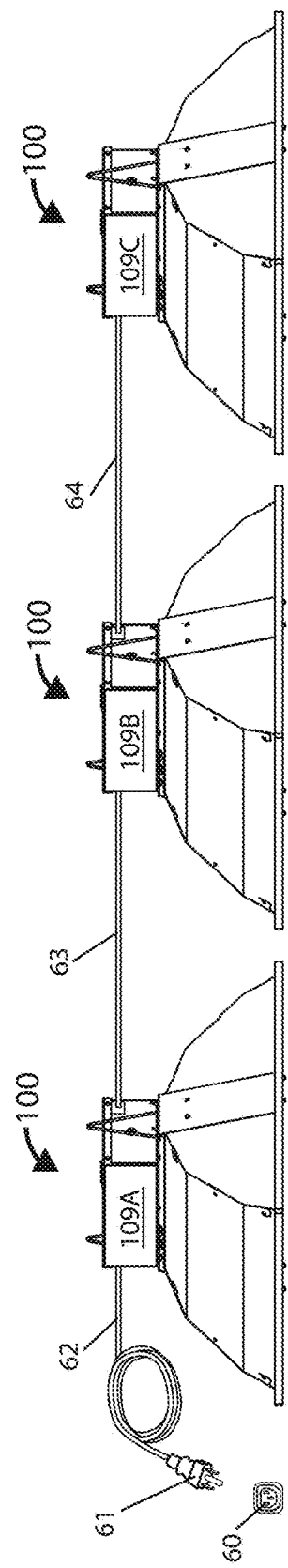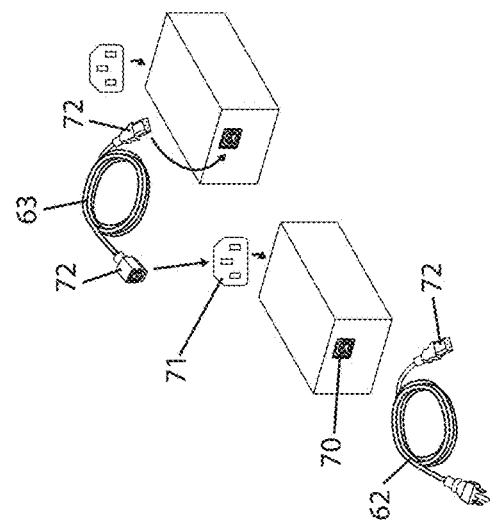

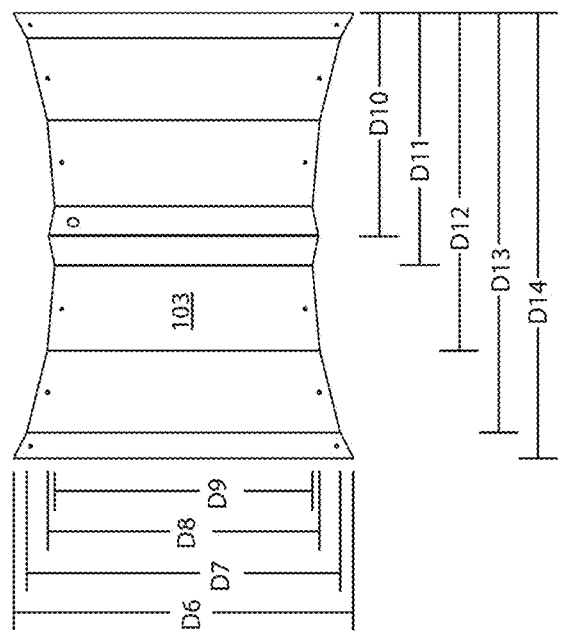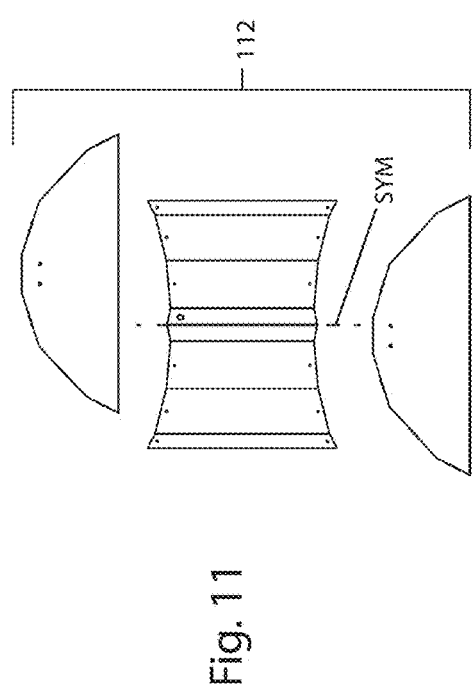
Fig. 11
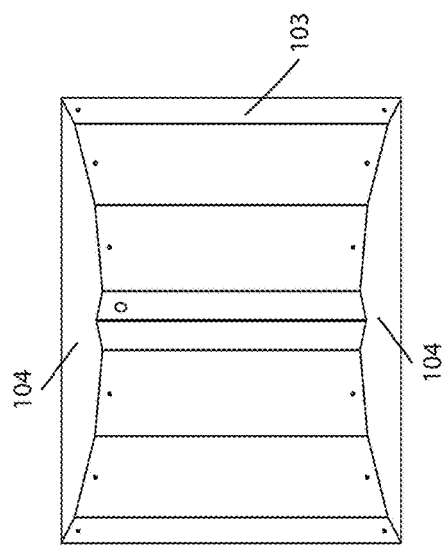
Fig. 12A
Fig. 12B

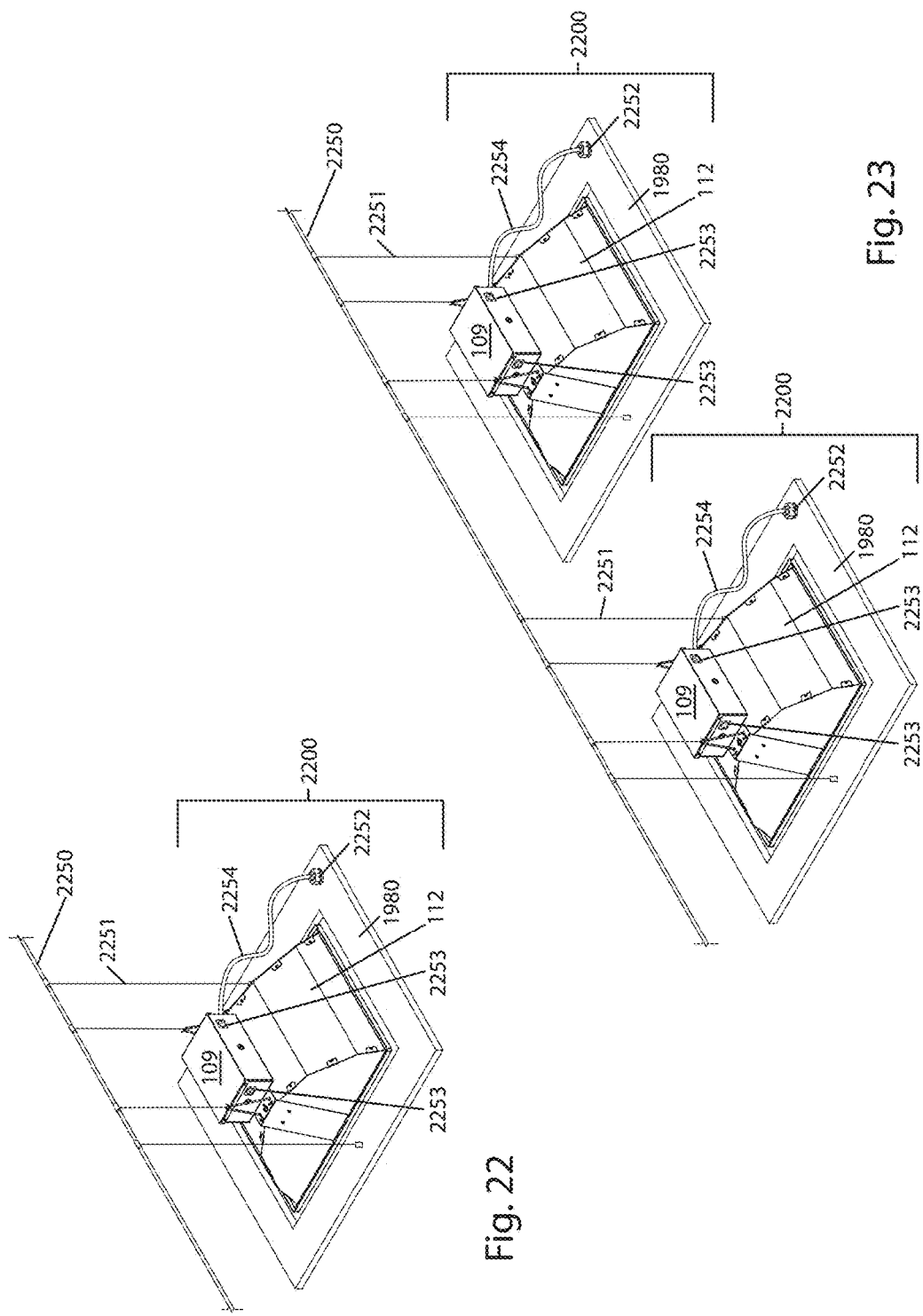

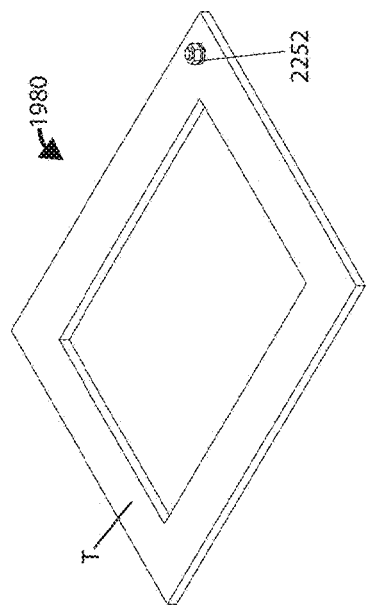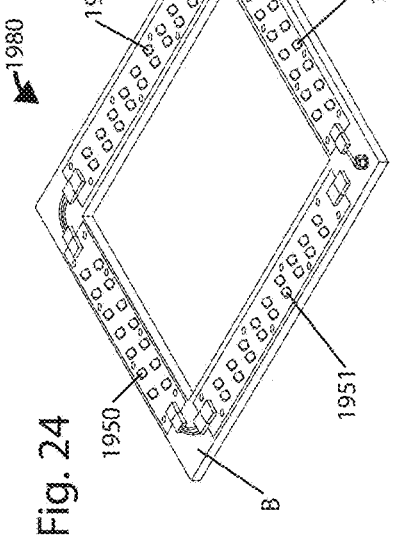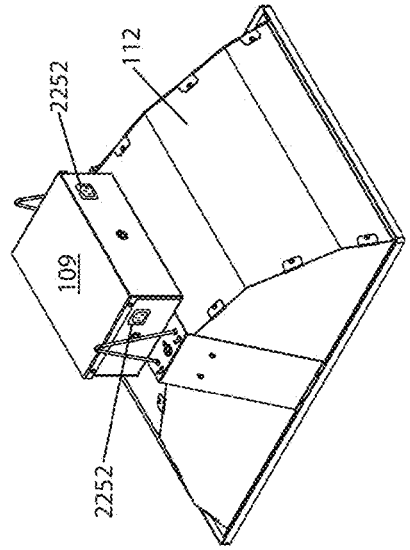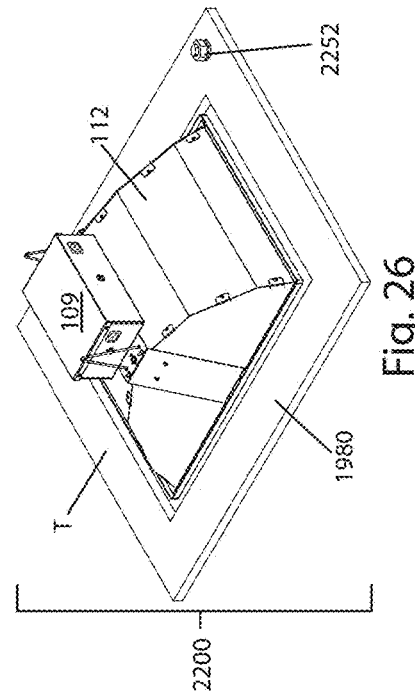

US 10,143,144 B2

DAISY CHAIN GROW LIGHT

PRIORITY

The present application claims priority to U.S. Provisional Application No. 62/184564 filed Jun. 25, 2016 entitled Daisy Chain Grow Light and 62/219822 filed Sep. 17, 2015 entitled Independent Augmentation Panel which have the same inventor as the present filed application.

FIELD OF INVENTION

The present invention relates to High Intensity Discharge (HID) lamps, especially ceramic lamps, that are constructed for efficient use in a greenhouse environment.

BACKGROUND OF THE INVENTION

It is known in the art that ceramic discharge lamps (CDL) deliver more useful grow light and produce less heat than LED's. It is known that CDL lamps' spectrum closely match sunlight. A popular greenhouse grow light is the 315 w Phillips Agro lamp, the CDM-T Elite™. It is known to surround the lamp with a reflector and attach the ballast inside the reflector, and then hang the apparatus over the growing plants.

Many shortcomings exist in the present configurations of CDL grow lights. The present invention provides new and non-obvious features including a top mount ballast to optimize the reflector size, a plug in ballast to allow a quick field installed replacement, a daisy chain of sharing up to ten lamps powered by a single high voltage receptacle, an optional LED light enhancing peripheral frame, an optional magnetic coupled water screen and an optional solar panel power inlet.

SUMMARY OF THE INVENTION

An main aspect of the present invention is to provide a hanging CDL lamp with a plug in top mount ballast housing.

Another aspect of the present invention is to provide a daisy chain connectivity to multiple ballast housings, powered by a single receptacle.

Another aspect of the present invention is to provide an LED peripheral frame augmented light to interchangeably augment certain colors during the various growth phases. These colors could include UV, blue, red, far red, and infrared. Fluorescent or induction lights could be used.

Another aspect of the present invention is to provide for a solar panel inlet power source.

Another aspect of the present invention is to provide a removable water screen for the lamp, attachable by a magnetic clip.

Another aspect of the present intention is to provide a primary reflector that maximizes the light lumens on the plants.

Other aspects of this invention will appear from the following description and appended claims, reference being made to the accompanying drawings forming a part of this specification wherein like reference characters designate corresponding parts in the several views.

A stiff frame is located central to the rectangular reflector and on the reflector housing top. An optional plug can be wired to the frame to enable a plug in connection of a ballast box. The leads of the plug power the receptacle for the CDL bulb. Another embodiment uses a wire connector to the ballast. Thus, none of the interior of the reflector housing is wasted on a ballast box. If the ballast box fails, then a quick disconnect field replacement is done. The lamp assembly can remain in place. Only the ballast box needs to be sent back to the manufacturer for service, not the entire lamp assembly.

Several ballast boxes can be daisy chained using standard power cables. This feature saves money at the greenhouse by reducing the number (by up to ten per 20 A circuit breaker) of high voltage receptacles.

An optional feature is a solar power DC inlet port.

Another optional feature is a clip on peripheral frame LED light source to enable the grower to augment certain colors during various growth phases. The LED lights share the ballast box for power.

During spray watering of the plants, an optional magnetic clip on water shield can protect the CDL bulb.

BRIEF DESCRIPTION OF THE DRAWINGS

FIG. 2 is an exploded view of the present invention with an onboard ballast.

FIG. 6 is a front perspective view of a plurality of daisy chained lamps.

FIG. 7 is an exploded view of daisy chained ballasts.

FIG. 11 is an exploded view of the lamp body 112.

FIG. 12a is a bottom plant view of the lamp body 112.

FIG. 12b is a bottom plant view of the primary reflection 103 showing dimensions.

FIG. 22 is a top perspective view of an augmentation frame 1980 which is separated from the lamp body 112 forming a lamp system 2200.

FIG. 23 is a top perspective view multiple lamp systems 2200.

FIG. 24 is a bottom B perspective view of the augmentation frame 1980.

FIG. 25 is a top T perspective view of the augmentation frame 1980 showing a power entry cord grip 2252.

FIG. 26 is a top perspective view of the lamp system 2200.

FIG. 27 is a top perspective view of the lamp body 112.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
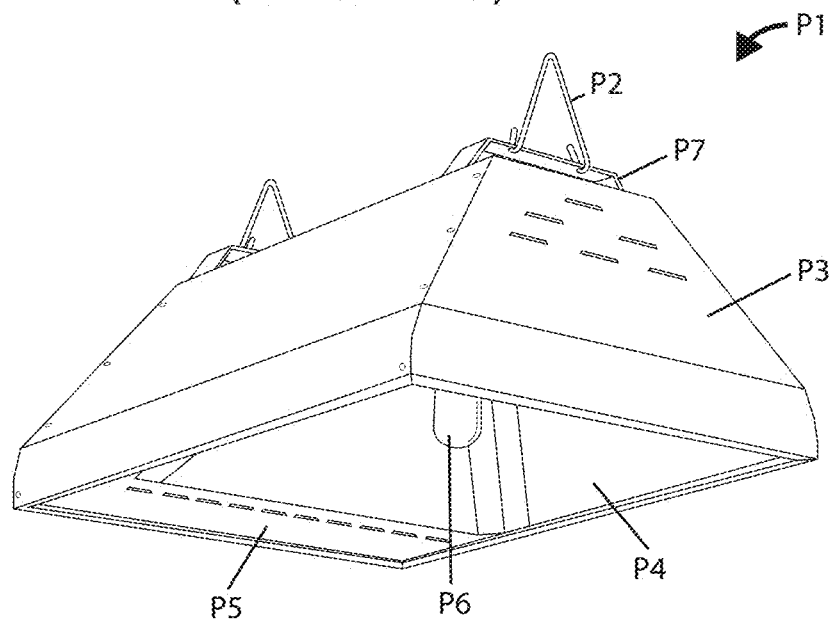
FIG. 1 (prior art) is a bottom perspective view of a hanging CDL lamp.

FIG. 1 is a prior art hanging lamp P1 which is made by Sunlight Supply, Inc. and the Sun System® LEC® 315 Light Emitting Ceramic® Fixture.

A metal housing P3 has top brackets P7 with holes to accept prior art hooks P2. A lamp P6 is screwed into a receptacle (not shown) in the housing P3. The interior of the housing P3 has a reflector P4. The ballast P5 shares the housing P3 with the reflector P4 and reduces the amount of transmitted light. If the ballast P5 fails, than the entire lamp P1 must be returned to the factory for repair.

Sun System® LEC® 315 utilizes Light Emitting Ceramic® technology. The fixture has 98% reflective German aluminum insert and 95% reflective textured corners for excellent output, uniformity and diffusion. Highly efficient agriculturally engineered CDM-T Elite 315/930/U/O Agro Lamp (lamp included). It provides improved full color light spectrum out of next generation ceramic lamps. Higher amounts of beneficial UV and infra red spectrums increase the lamps growth power to the plants. Very high 1.95 PPF per second light source. 3100° K of 4200° K color temperature, high 92 CRI, 33,000 initial lumens (105 Lm/W). Long life 20,000 hour lamp. High 90% lumen maintenance @8000 hr. High 85% PPF maintenance @20,000 hr. Unique open rated lamp construction reduces radiant heat from the arc tube and is suitable for open fixture use. 50/60 Hz low frequency, square wave, highly efficient electronic ballast rated for 50,000 hour ballast life. LEC® 315 driver incorporated built in thermal protection.

Referring next to FIG. 2 the lamp 100 has a U shaped top frame 101 which connects to a rectangular bottom frame 102. An arch shaped primary reflector 103 connects to the bottom frame 102. Side reflector 104 also connects to the bottom frame 102. This side reflector 104 supports a lamp socket holder 105 which supports a lamp socket holder 105 which supports a lamp socket 106 in a horizontal orientation. The CDL lamp 107 is preferably the prior art Phillips Mastercolor CDM-T Elite Med Wattage Agro. The product data follows below.

Product Data

| General Characteristics | |
| --- | --- |
| Base | PGZX18. |
| Bulb | T12 [38 mm] |
| Bulb Finish | Clear |
| Operating Position | Universal [Any or Universal (U)] |
| Main Application | Agro |
| Life to 10% failures EL | 12000 hr |
| Avg. Hrs. Life | 30000 hr |
| Light Technical Characteristics | |
| Color Code | — |
| Color Rendering Index | 92 Ra8 |
| Color Designation | — |
| Color Temperature | 3100 K |
| Color Temperature technical | 3100 K |
| Initial Lumens | 33000 Lm |
| Luminous Efficacy Lamp EL | 105 Lm/W |
| Lumen Maintenance 8000 h | 90% |
| Photosynthetic Photon Flux PPF | 1.9 umol/s |
| Chromaticity Coordinate X | 0.41 — |
| Chromaticity Coordinate Y | 0.365 — |
| Electrical Characteristics | |
| Watts | 315 W |
| Lamp Wattage EL 25° C. Rated | 315.0 W |
| Lamp Wattage EL 25° C. Nominal | 315.0 W |
| Lamp Voltage | 98 V |
| Lamp Current EL | 3.15 A |
| Lamp Current Run-Up | 4.7 A |
| Ignition Time | 3 (max) s |
| Run-up time 90% | 3 (max) min |
| Re-ignition Time [min] | 10 (max) min |
| Environmental Characteristics | |
| Energy Efficiency Label (EEL) | A+ |
| Mercury (Hg) Content | 28 (max) mg |
| Picogram per Lumen Hour | 44.4 p/LuHr |
| Energy consumption kWh/1000 h | 346 kWh |
| UV-related Characteristics | |
| Damage Factor D/fc | 0.17 — |
| PET (NIOSH) | 241 h500lx |
| UV A | 4.65 mW/cm2 |
| UV B | 0.02 mW/cm2 |
| UV C | 0.02 mW/cm2 |
| Luminaire Design Requirements | |
| Cap-Base Temperature | 250 C. |
| Pinch Temperature | 350 (max) C. |
| Bulb Temperature | 350 (max) C. |

Figure 8:
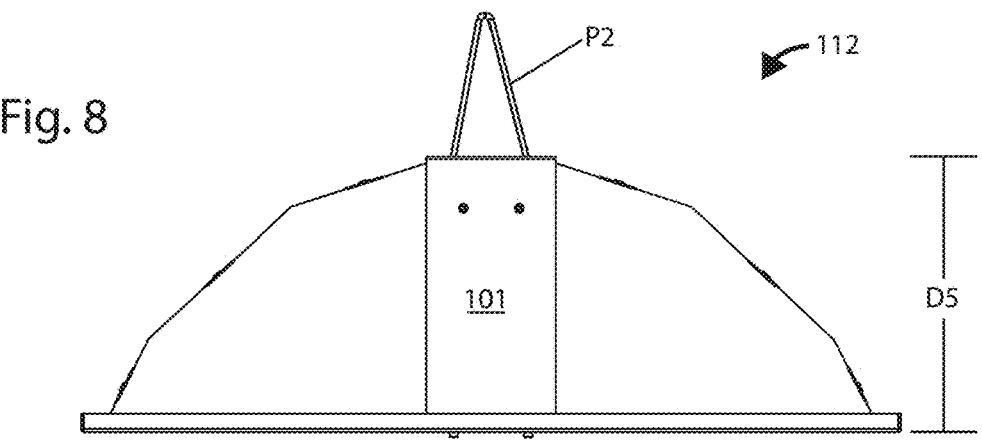
FIG. 8 is a left side elevation view of the FIG. 3 embodiment.
Figure 9:
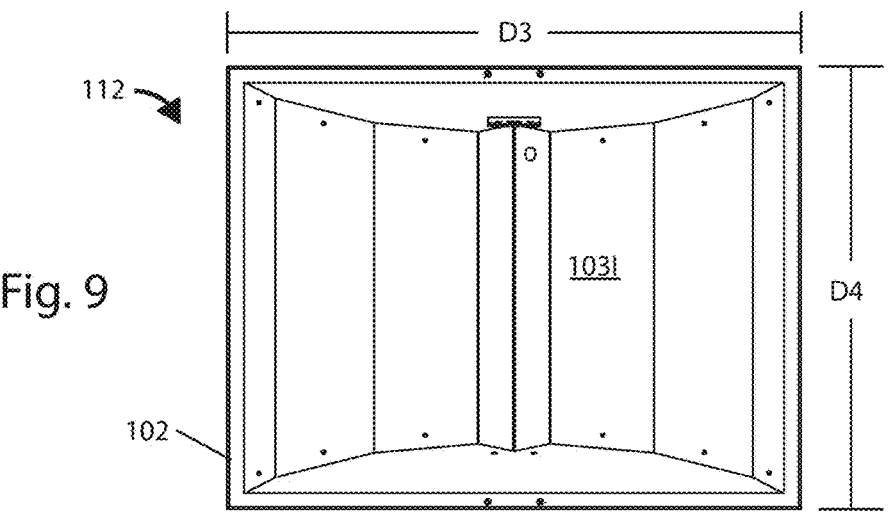
FIG. 9 is a bottom plan view of the FIG. 3 embodiment.

Nominal dimensions are d1=7.63 inch, d2=12.21 inch, angle A=105°, d3=22.18 inch, d4=17.18 inch, d5=7.48 inch (see FIGS. 8, 9). The hooks P2 fit into holes 108 on top frame member 101T. Top frame member 101T can support the ballast 109. A wire (not shown) exits hole 110 to interconnect the lamp 107 with the ballast 109. The side reflector 104 completes the reflector surfaces. Thus, the ballast 109 can be quickly unplugged and unscrewed from the top frame member 101T and replaced without disturbing the lamp body labeled 112.

The bottom frame 102 is folded upward shown at 113 creating an inner slot on all four sides of the bottom. This slot may be used to attach auxiliary devices such as ballast, panel mounted LED, linear LED, UV, infra-red (IR), wherein additional grow light is needed for specific stages of growth. A waterproof snap on or magnetic cover 199 can be provided for watering.

The ballast 109 could be mounted via the slot in bottom frame 102 or remotely.

An optional water shield 200 is shown where magnets M attach it to the frame 102 during watering. The ballast may have a solar inlet SPI.

Figure 3:
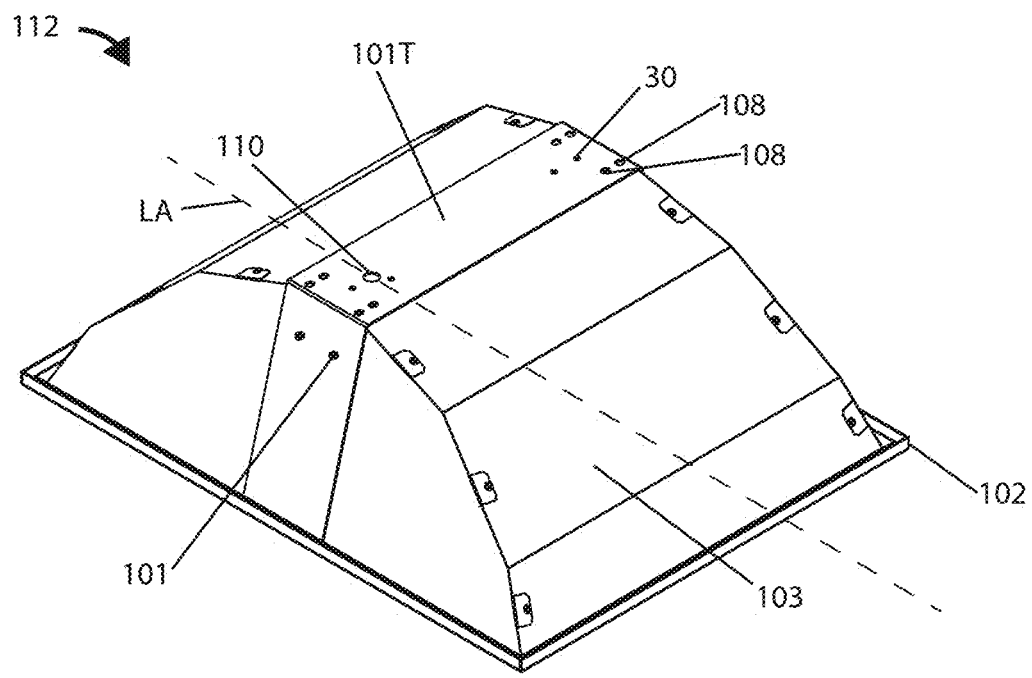
FIG. 3 is a top perspective view of the FIG. 2 embodiment without the ballast, showing a longitudinal axis LA.

Referring next to FIG. 3 the lamp body 112 is shown. The ballast 109 could be mounted into holes 30 or it could be mounted remotely.

Figure 4:
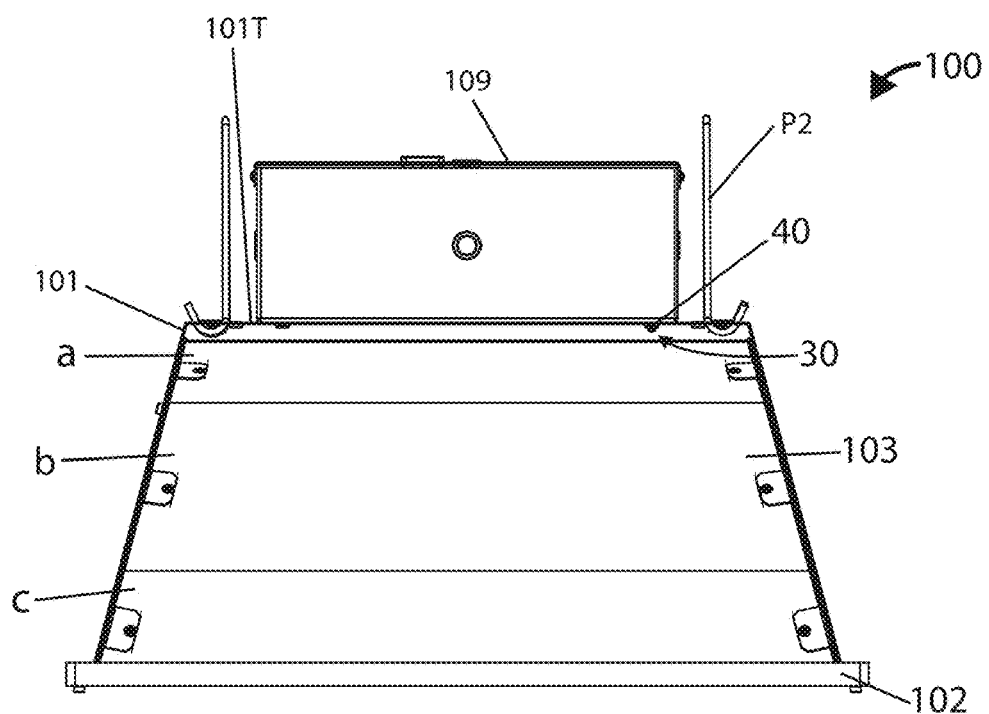
FIG. 4 is a front elevation view of the FIG. 2 embodiment.

Referring next to FIG. 4 the ballast 109 has a screw fastener 40 threaded into hole 30 on top frame member 101T. The primary reflector is flexible and can be made from connected segments a, b, c.

Figure 5:
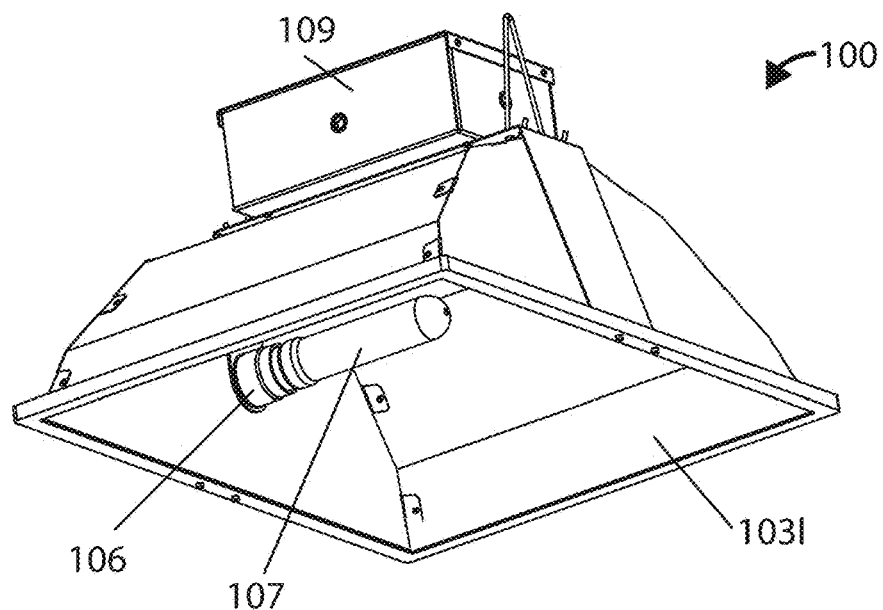
FIG. 5 is a bottom perspective view of the FIG. 2 embodiment.

Referring next to FIG. 5 the primary reflector 103 has an inside reflective layer 103I.

Referring next to FIGS. 6, 7 all three lamps 100 are the same. The electronics design is aimed at daisy chaining ten lamps together using one high voltage outlet 60 (a 20 amp circuit) wire 62 has plug 61 for outlet 60. Wires 63, 64 are identical. Each has a female receptacle 72 (IEC 60302 C13 female) to interconnect the male receptacles 70 (IEC 60302 C14 male) on the ballast 109a, 109b, 109c.

Figure 10A:
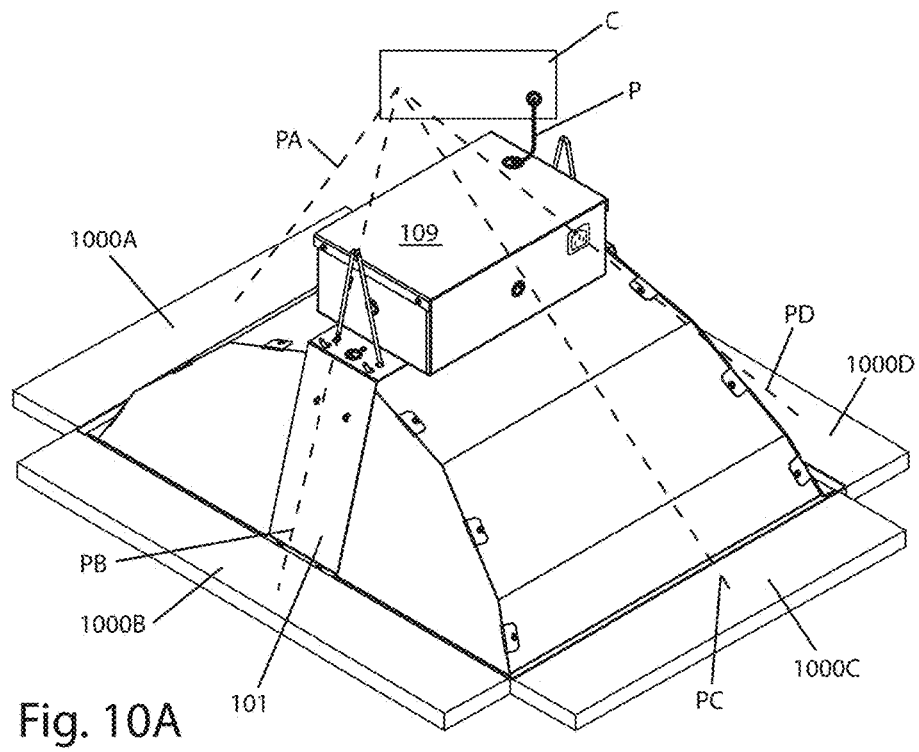
FIG. 10a is a top perspective view of the FIG. 2 embodiment with optional LED enhancer lights installed.

FIG. 10A shows the lamp 100 with added peripheral light panels 1000a, 1000b, 1000c, 1000d which are powered by a separate power supply which may be inside the ballast 109. Each panel adds a chosen light spectrum for a growth stage. Each panel could be a flat panel LED, fluorescent tube, or other artificial light source an optional controller C can control periodic pre-programmed ON/OFF cycles for each peripheral light panel. Dangerous UV-C light panels may have time delay safety circuits or equivalent systems to prevent humans from exposure.

Figure 10B:
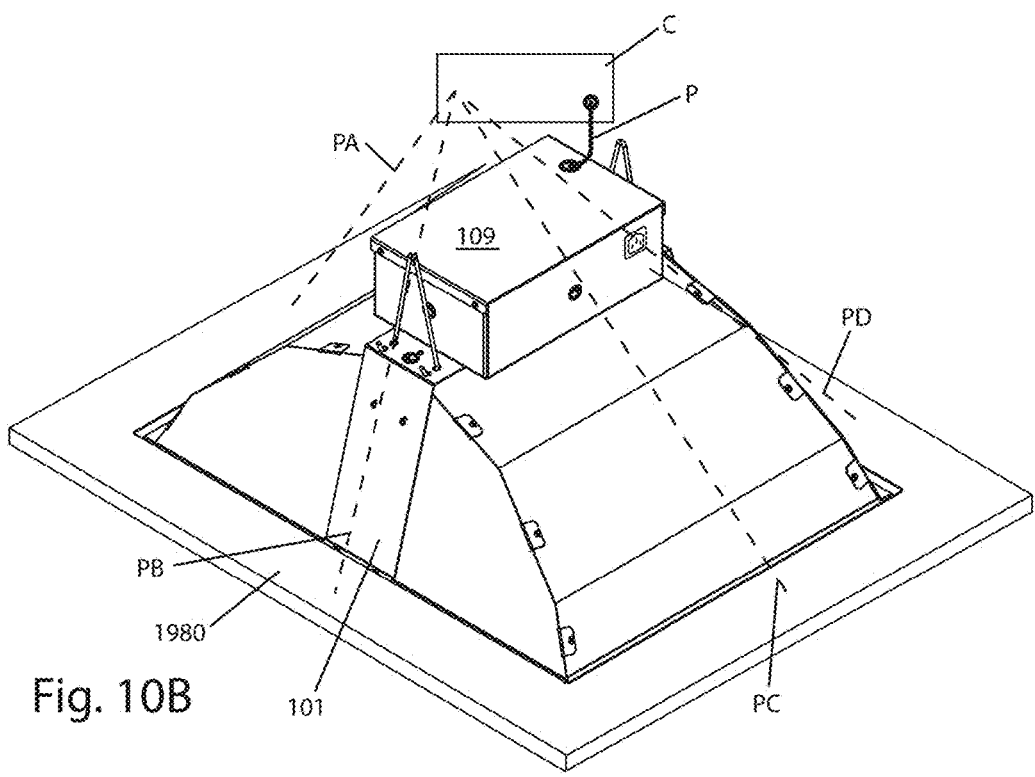
FIG. 10b is the same view as FIG. 10a with a rectangular light panel.

An alternative mounting means is shown in FIG. 10B where a lower housing periphery light panel 1980 could use the top frame 101 and required brackets (not shown). Another embodiment (not shown) has the light panel 1980 formed integral with the reflector 103.

All control and memory functions may also be executed wirelessly utilizing an off-the-shelf wireless transmitter and receiver and, as well as by downloading a custom app into a smartphone and optional Bluetooth communication.

The power line P connects the ballast 109 to the controller C. Controller relays send the power, as programmed, to the light panels via wires PA, PB, PC, PD.

Figure 13:
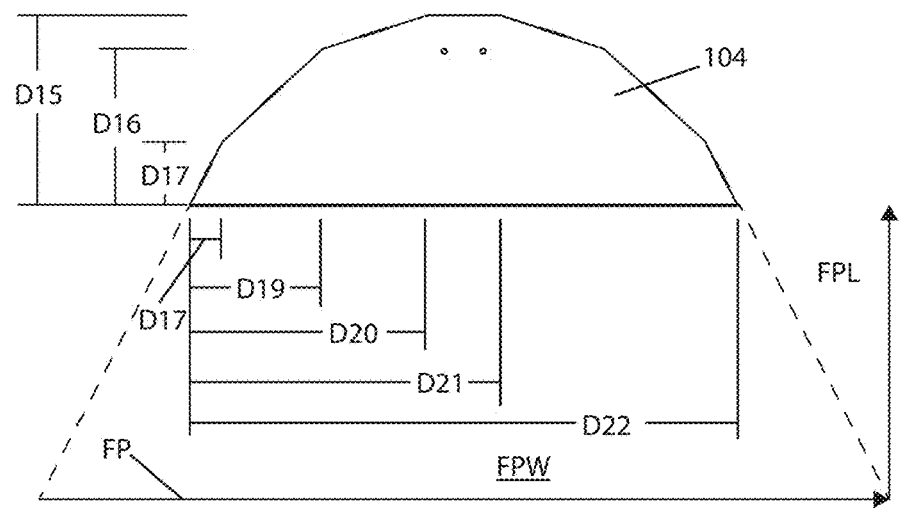
FIG. 13 is a side elevation view of a side panel 104 showing dimensions.

In FIG. 13 the footprint of the light at a height of one foot off the ground is labeled FP. The length of FP is denoted FPL and is about 3.5 feet. The width of FP is denoted FPW and is about 3.0 feet.

Nominal dimensions are:
D15=7.5 in.
D16=6.3 in.
D17=2.6 in.
D19=5.12 in.
D20=9.25 in.
D21=11.75 in.
D22=21.0 in.
D3=22.8 in.
D4=17.18 in.
D6=17.0 in.
D7=15.75 in.
D8=12.8 in.
D9=13.0 in.
D10=10.5 in.
D11=12.24 in.
D12=15.95 in.
D13=19.75 in.
D14=21.0 in.

The primary reflector in FIGS. 11, 12a, 12b, 13 is labeled 103 and is made of a single piece of sheet metal which is folded into nine sections. It is symmetrical from axis SYM shown in FIG. 11.

Figure 14:
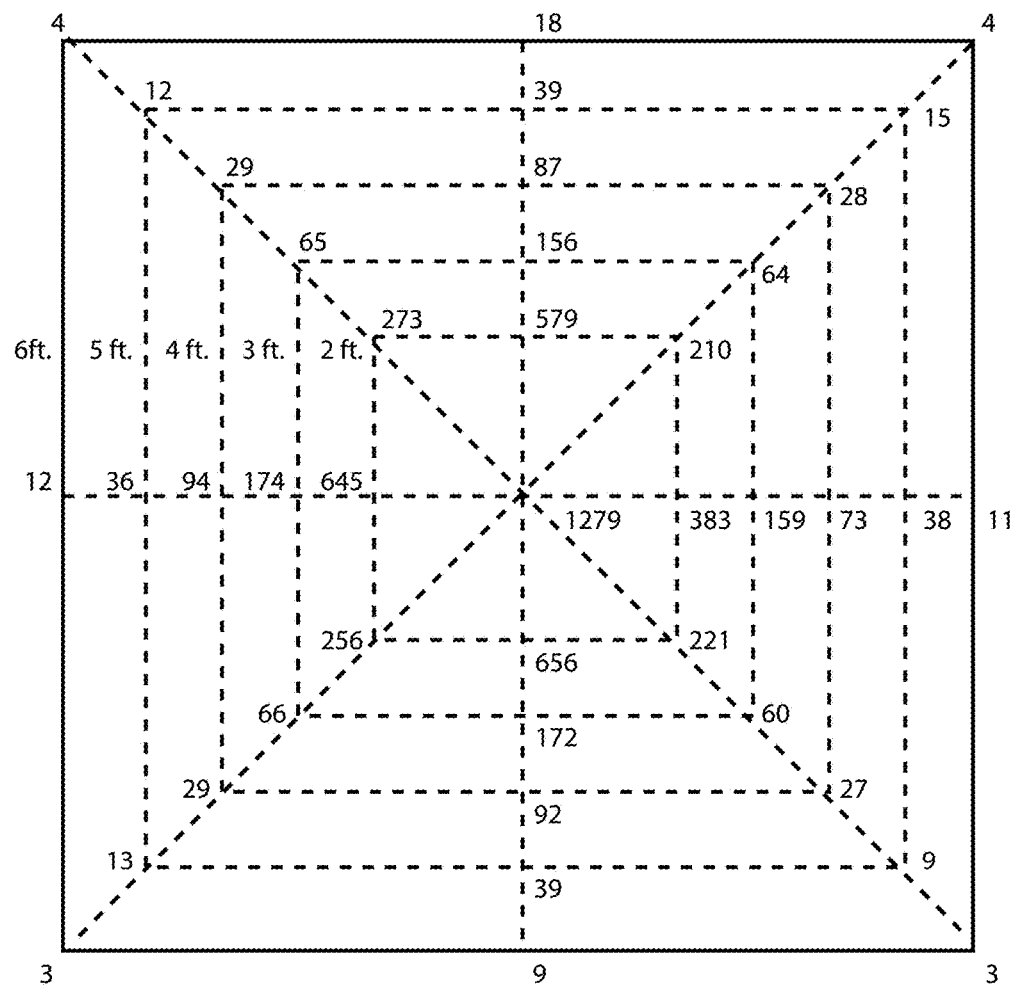
FIG. 14 is a measurement chart made by Growlife™ (a retailer) of the PAR light values of a prior art sun system lamp at one foot away from the lamp.
Figure 15:
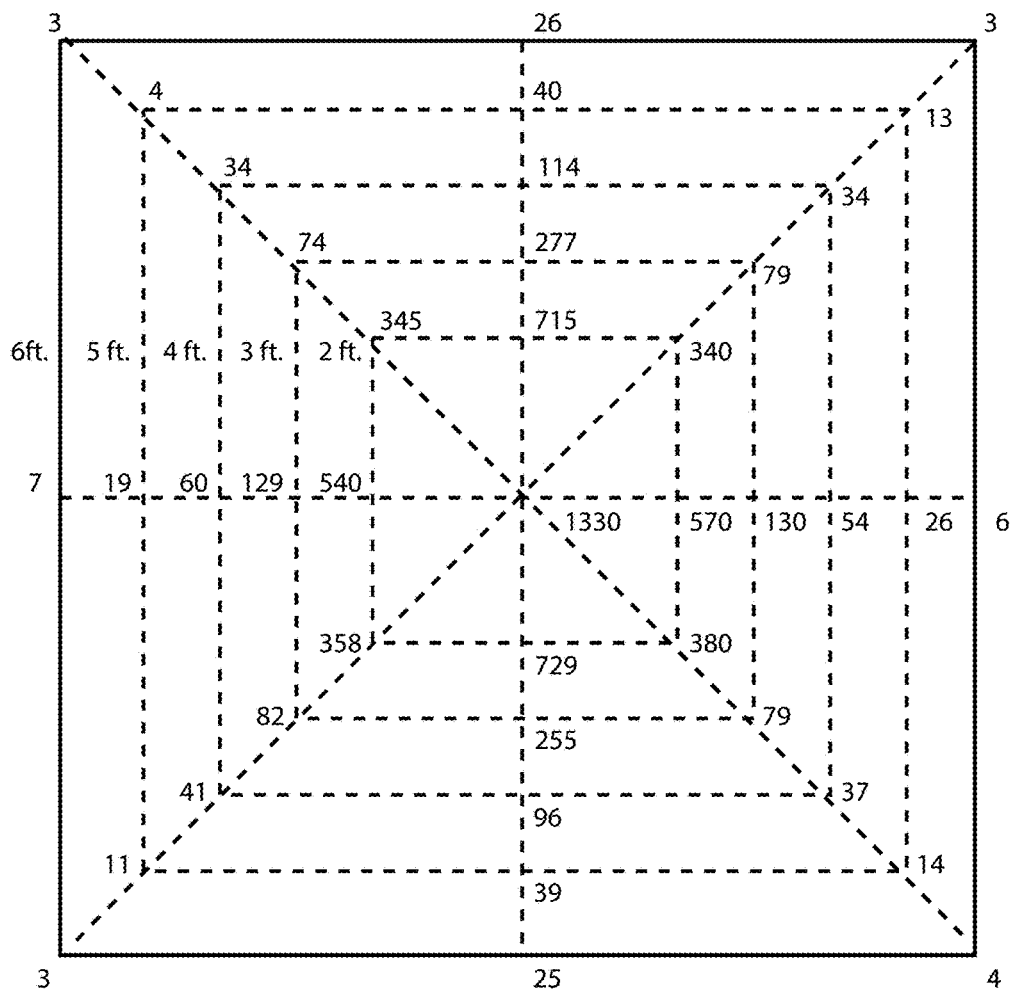
FIG. 15 is a measurement chart made by Growlife™ of the present invention PAR values at the same one foot distance.
Figure 16:
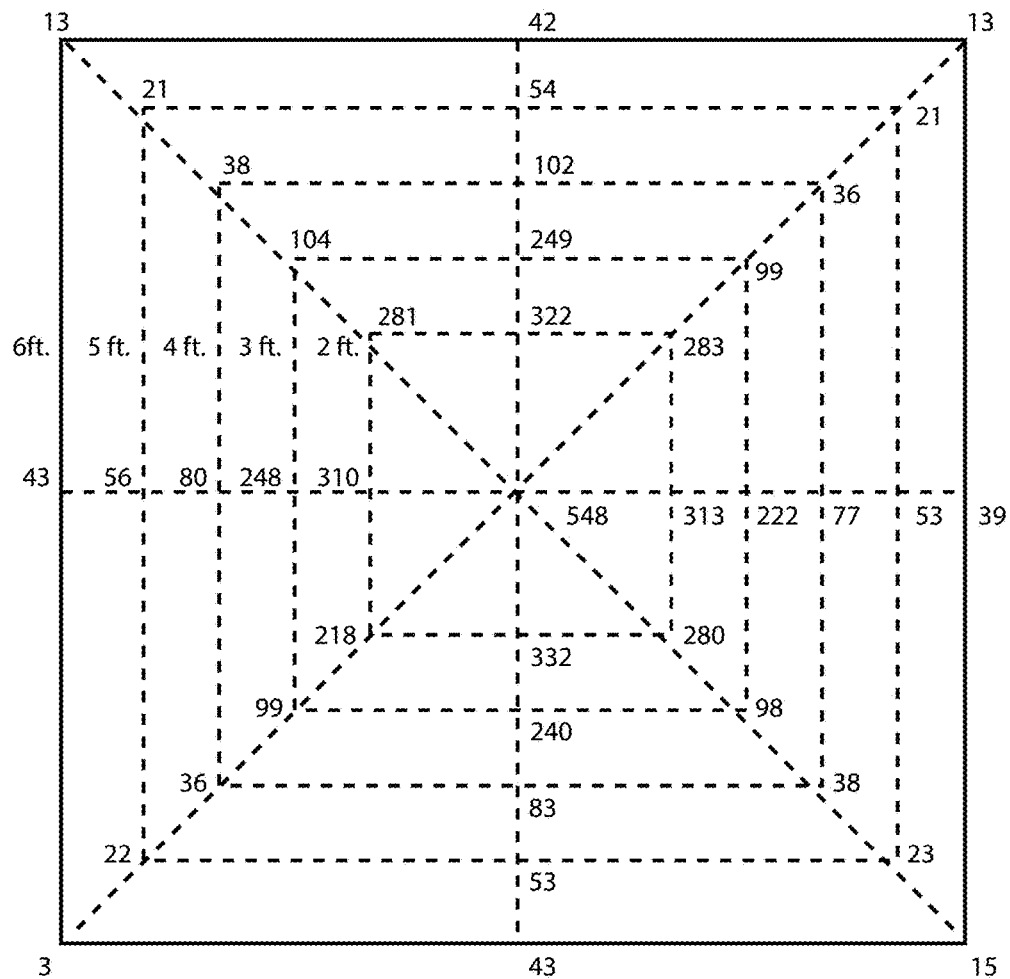
FIG. 16 is a measurement chart made by Growlife™ of the sum system lamp at two feet.
Figure 17:
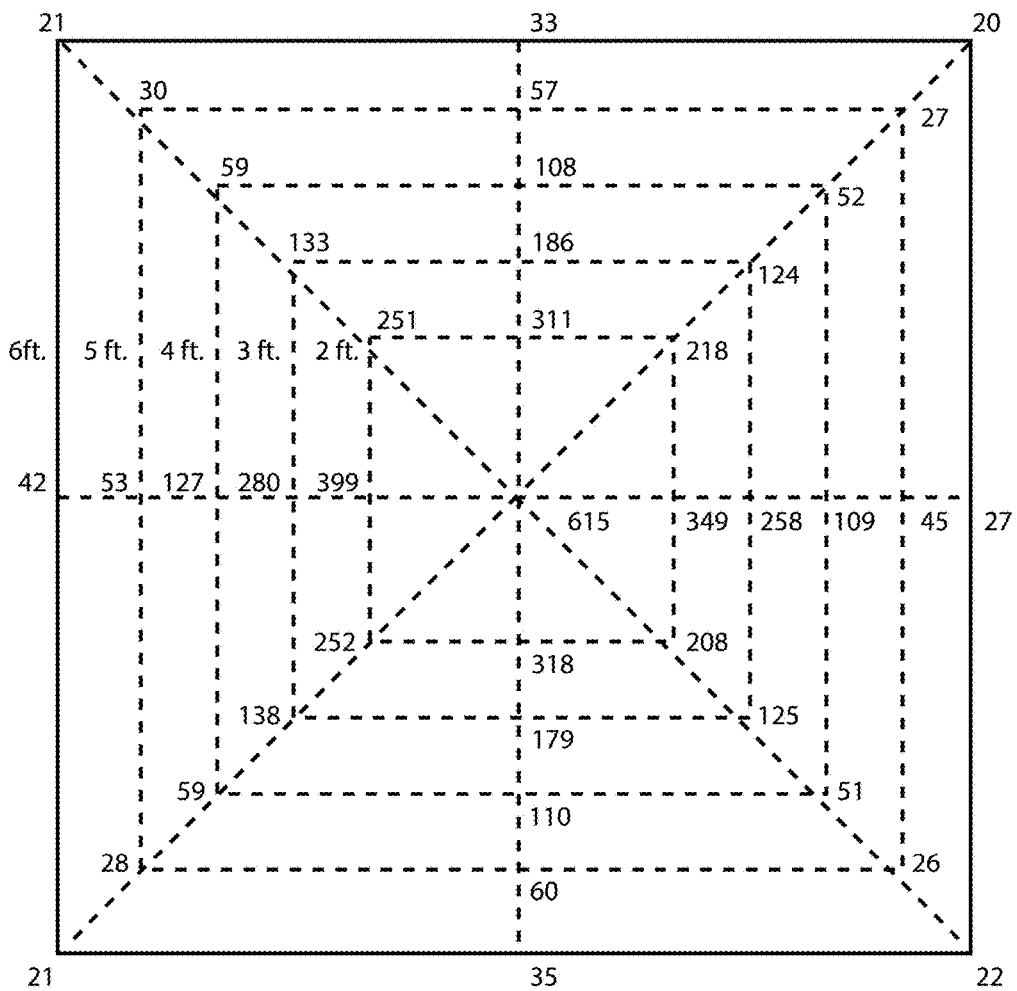
FIG. 17 is a measurement chart made by Growlife™ of the present invention PAR values at the same two foot distance.

FIG. 14 shows a prior art Sun System light output (at one foot, measured in PAR) versus a FIG. 15 present invention lamp made by Boulder Lamp. FIG. 16 shows the Sun System light at two feet versus the present invention (Boulder Lamp) values in FIG. 17.

Figure 19:
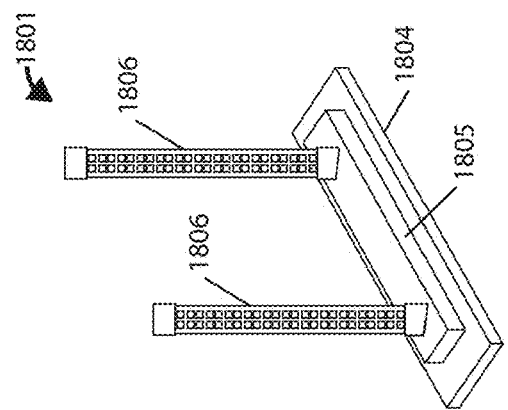
FIG. 19 is a bottom perspective view of the vertical lights shown in FIG. 18.
Figure 18:
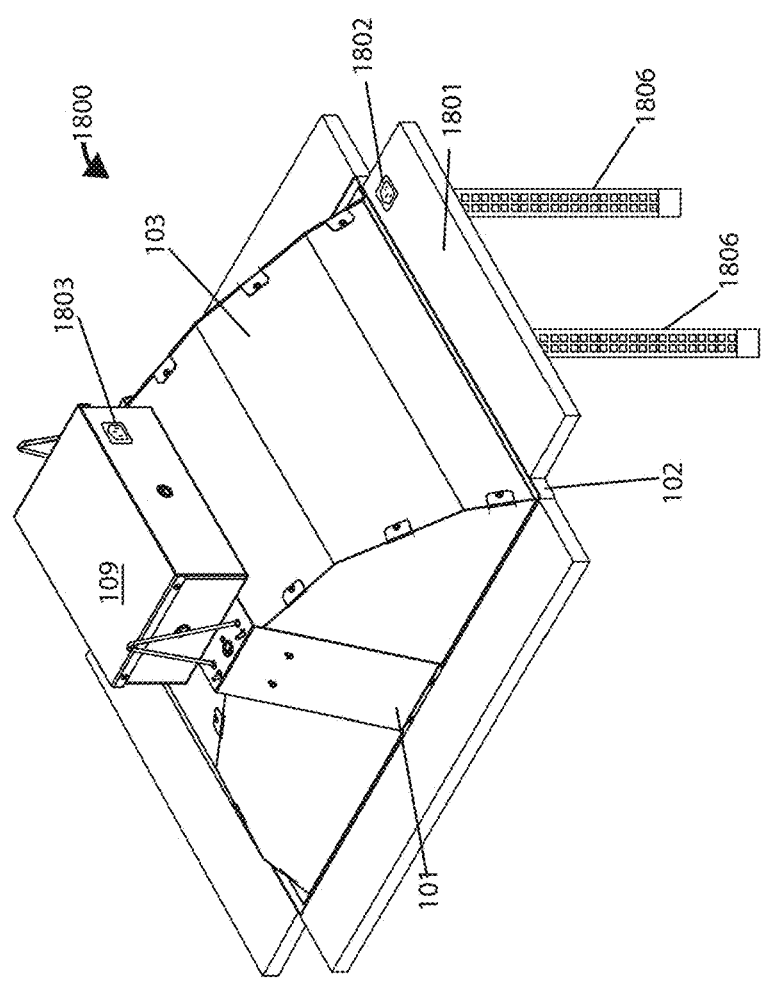
FIG. 18 is a top perspective view of a lower frame supporting vertical (LED) lights.

Referring next to FIGS. 18, 19 a lamp 1800 has a vertical augmented light panel 1801 which has a power receptacle 1802 to get power from the power outlet 1803 of the ballast 109. The power cord is not shown. A base 1804 is connected to the lower frame 102 (not shown is an optional mount to the upper frame). A receptacle 1805 supports vertical LED's 1806.

Figure 20:
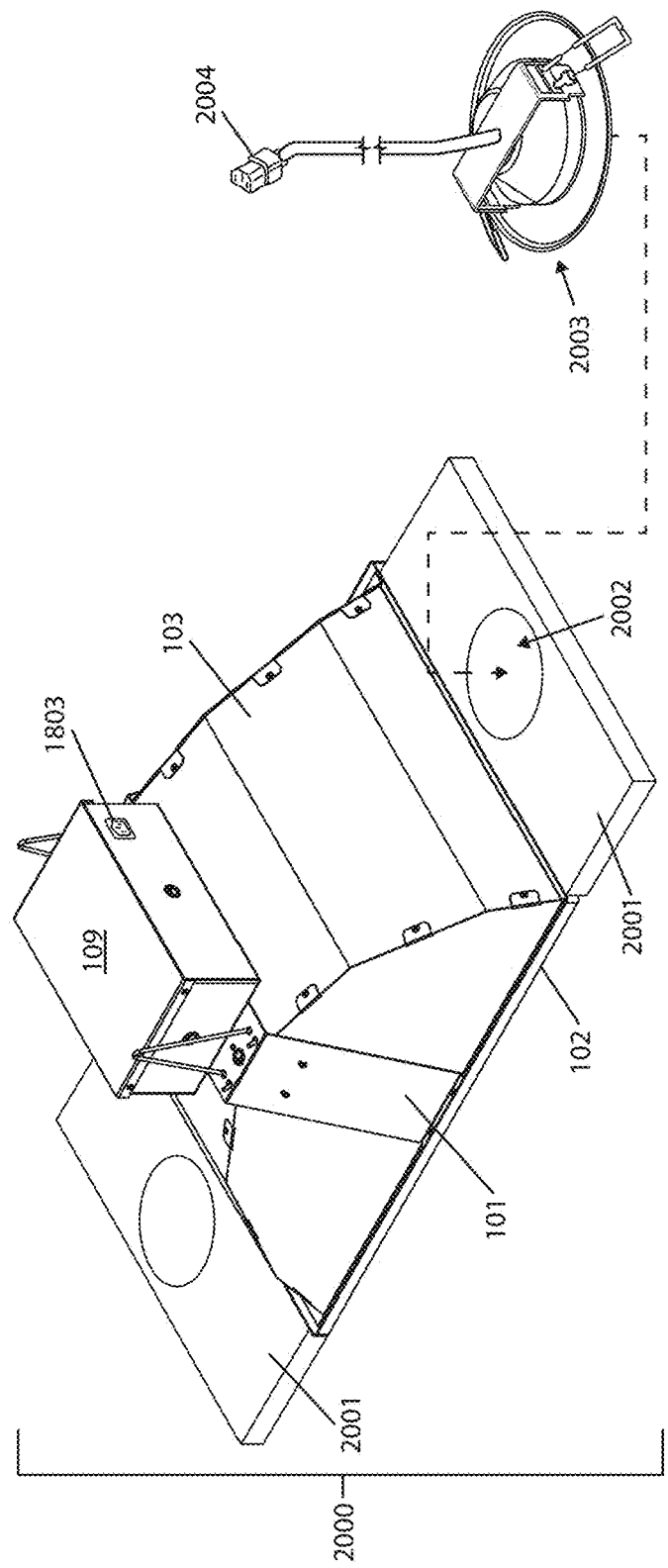
FIG. 20 is a top perspective exploded view of a lower frame supporting a downlight lamp.

Referring next to FIG. 20 a lamp 2000 has a downlight panel 2001 fastened to the lower frame 102 (optional connection to upper frame 101 not shown). A mounting hole 2002 supports the LED lamp 2003. Power jack 2004 connects to power outlet 1803.

Here is how growers can select their peripheral light panels:

Grow Hack: How to Use a UV Lamp to Increase THC
High Times—By SIRIUS J Mon Mar. 23, 2015

*Cannabis* researchers in Maryland exposed pot plants to ultraviolet radiation to see what would happen. They found that increasing doses of UVB radiation, a natural part of sunlight made the plants produce almost 28% more THC in the buds.

In attempting to understand more about the function cannabinoids serve, the scientists discovered a relatively simple way to increase potency by a great margin. They ran the UVB experiment on both high-CBD hemp and potent Jamaican marijuana to see if the cannabinoids content would increase. Curiously enough, while THC increased in the Jamaican weed, the Czechoslovakian hemp received from the University of Mississippi did not produce more CBD.

So UVB radiation plays a role in THC production, but cannabinoids as a whole still retain their mystique. One fact can't be denied: UVB radiation increases THC in strains that already express high THC.

How to Take Advantage of the Effect

UV light intensity increases significantly at higher altitudes; the best hash plants in the world are grown in mountains and elevated regions. According to the National Weather Service, UV light increases "4-5% for every 1000 feet ascended." This means going from Phoenix to the top of the San Francisco Peaks increases UV radiation by 50%!

States like Arizona, New Mexico and Colorado receive some of the highest intensities of UV light with little cloud cover compared to northern states.

Special fluorescent light bulbs generate radiation similar to natural UV light, and were used in the study. Growers put the plants under 40W Westinghouse FS-40 Sunlamps 10 inches from the canopy. Those exact light bulbs might be hard to find now, but similar, relatively inexpensive products are available in bulk and would be the best option for greenhouse-sized grows. The lights were filtered with cellulose acetate to remove the UVC spectrum-potent, damaging ultraviolet rays that are naturally filtered out by the ozone layer.

Micro and mini grow-ops can benefit from UVB supplementation, but need smaller bulbs. Desert reptiles like the bearded dragon require the radiation to make vitamin D, just as humans do. You can purchase a small UVB-emitting lamp at most pet stores. Mineral enthusiasts also use UVB lamps to make their rocks fluoresce, but the small handheld lamps are probably not potent enough for even a single plant.

Wikipedia—Emerson Effect

The Emerson effect is the increase in the rate of photosynthesis after chloroplasts are exposed to light of wavelength 670 nm (far red light) and 700 nm (red light). When simultaneously exposed to light of both wavelengths, the rate of photosynthesis is far higher than the sum of the red light and far red light photosynthesis rates. The effect was earlier evidence that two photosystems, processing different wavelengths, cooperate in photosynthesis.

Other sources

Emerson Effect

Also known as "The Mars effect", this is an area for experimentation by advanced growers of marijuana indoors. It has been noted that the addition of far red light (700-720 nm) may double the rate of photosynthesis when used in conjunction with deep red light (650nm-670 nm). This effect only lasts for an hour or two. Far red LEDs or incandescent bulbs are the main sources of 720 nm light. Understanding this information should not concern the casual grower but it is good to know though.

Ultraviolet Light and Potency

There is yet another long-standing debate as to whether or not the addition of UV-A or UV-B increases the potency of indoor grows. This theory came about because of the generally higher THC may act to protect marijuana from UV damage. Despite several white papers published by reputable horticulturists, the answer remains murky. We believe this is so because most tests use low to moderate amounts of UV for a 12 hour period; whereas a shorter 1-3 hour burst of strong UV may be necessary to induce any effect.

UV-C to kill pests and molds: Germicidal Lamp

The term "UV" refers to relatively broad spectrum of light-anything from 100 nanometers to 400. So UV has been further divided into UV-A, UV-B, UV-C and UV-V. The part we are interested here is UV-C. It's the section of UV between 185 and 280 nanometers-also known as "short wave ultraviolet radiation". UV-C rays have the highest energy and are arguably the most dangerous part of UV light. (Although some would counter that UV-B is the more dangerous as it causes skin cancer.) Solar radiation in the UV-C range is absorbed almost entirely by the atmosphere. Artificial UV-C lamps have been shown to be super effective in the laboratory at destroying bacteria, mold, viruses and certain plant pests as well as other biological contaminants in the air, liquids, or on solid surfaces.

Figure 21A:
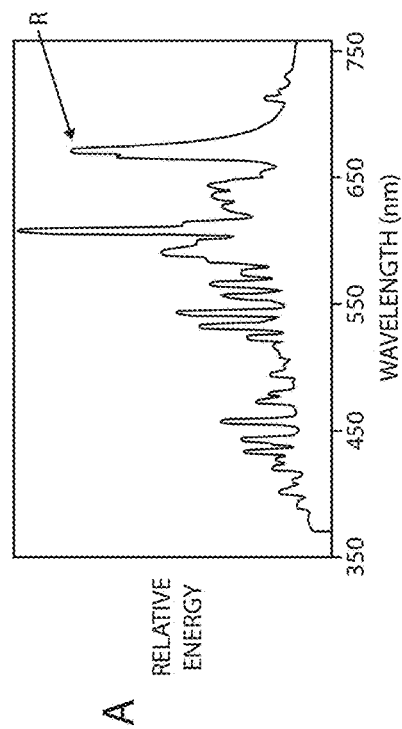
FIG. 21a (prior art) is a graph of the wavelength spectrum of the (preferred) Agro grow lamp.
Figure 21F:
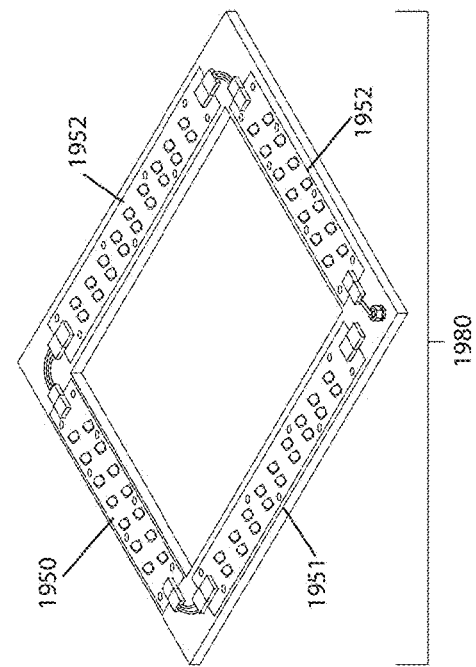
FIG. 21f is an augmented lamp of the present invention.

FIG. 21*f* shows how any lamp can be augmented (also called tuned) to a grower's specifications. The augmentation frame can be customized such as with LED strip 1951 providing UV, strip 1952 providing Emerson effect, and strip 1953 providing special effects.

Figure 21B:
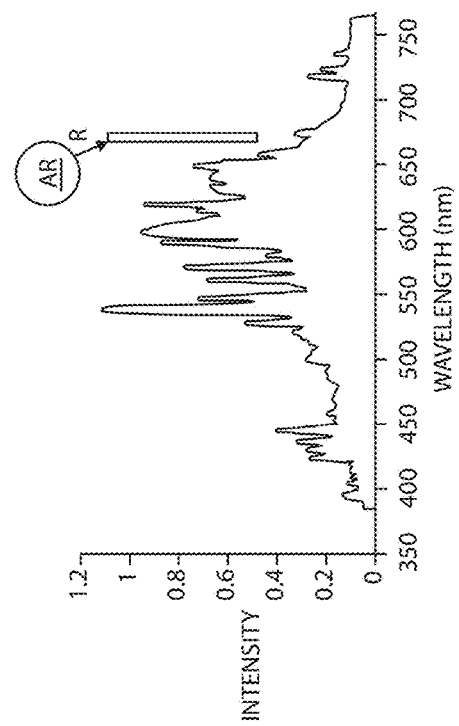
FIG. 21b is a graph of an alternate lamp, the Philips 315 w CDM Elite MW3100k which lacks the prominent red R wavelength shown in FIG. 21a, wherein an LED strip 1950 supplies the red wavelength labeled AR from an augmentation frame 1980.

FIG. 21*b* is a graph of an alternate lamp, the Philips 315 w CDM Elite MW3100k which lacks the prominent red R wavelength shown in FIG. 21*a*, wherein an LED strip 1950 supplies the red wavelength labeled AR from an augmentation frame 1980.

Figure 21C:
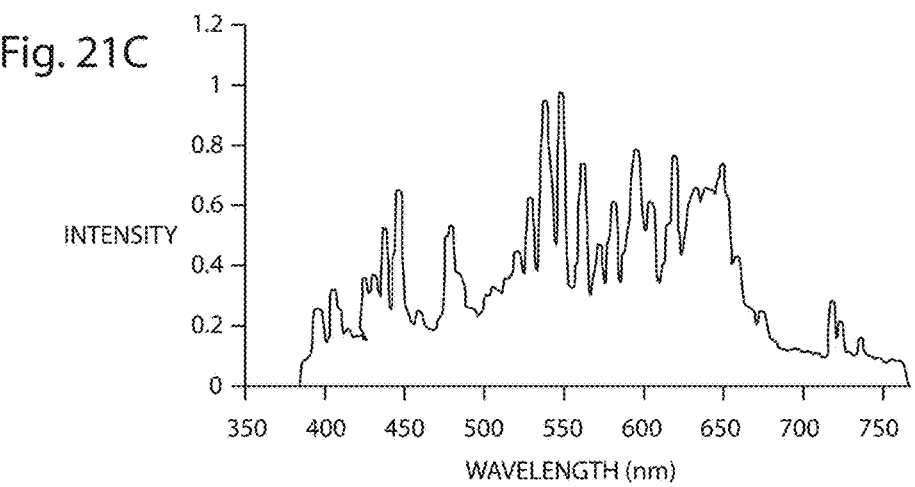
FIG. 21c (prior art) is a graph of a Philips 315 w CDM Elite 4200k lamp which could be augmented as shown in FIG. 21b.

FIG. 21*c* (prior art) is a graph of a Philips 315 w CDM Elite 4200k lamp which could be augmented as shown in FIG. 21*b*.

Figure 21D:
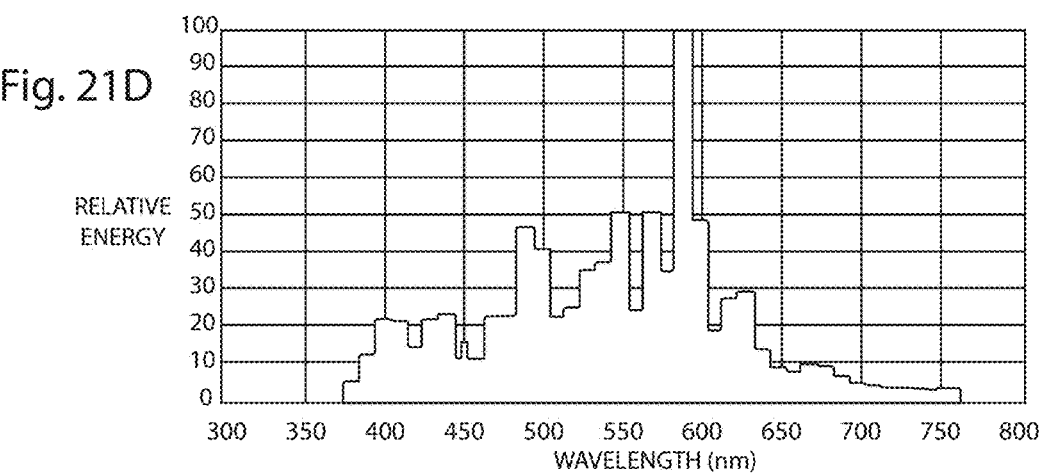
FIG. 21d (prior art) is a graph of a Venture 315 w CMH spectrum which could be augmented as shown in FIG. 21b.

FIG. 21*d* (prior art) is a graph of a Venture 315 w CMH spectrum which could be augmented as shown in FIG. 21*b*.

Figure 21E:
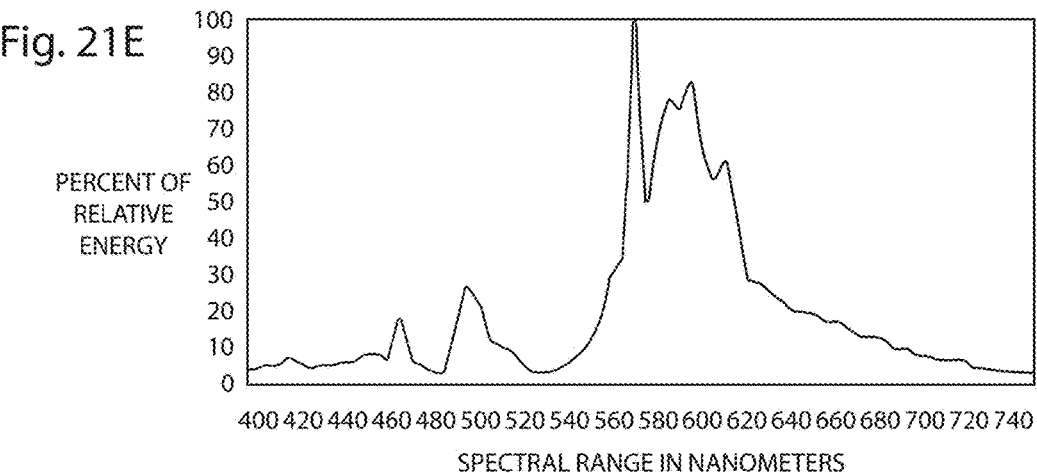
FIG. 21e (prior art) is a graph of a Hortilux 600 w HPS (sodium) spectrum which could be augmented as shown in FIG. 21b.

FIG. 21*e* (prior art) is a graph of a Hortilux 600 w HPS (sodium) spectrum which could be augmented as shown in FIG. 21*b*.

Referring next to FIG. 22 a separate augmentation frame 1980 is suspended from a common mounting rail 2250 by wires or rods 2251. The ballast 109 powers the receptacle 2252 from outlet 2253 via cord 2254. The augmentation frame 1980 is not attached to the lamp 112.

FIG. 23 is a top perspective view multiple lamp systems 2200.

FIG. 24 is a bottom B perspective view of the augmentation frame 1980.

FIG. 25 is a top T perspective view of the augmentation frame 1980.

FIG. 26 is a top perspective view of the lamp system 2200.

FIG. 27 is a top perspective view of the lamp body 112.

Color augmentation will be used in 2 broad areas, namely, 1) converting a non-agro (commercial) lamp into an agro lamp and 2) indoor plant grow enhancement.

1. Converting a non-agro (commercial) lamp into agro lamp: The primary differences between agro and non-agro lamps are as follows:
   a) UV part of light spectrum in commercial lamps are eliminated or minimized
   b) Red and blue parts of light spectrum in agro lamps are tailored.

Therefore, non-agro lamps can be made to provide agro lamp characteristics by desired color augmentation that generates an agro like spectrum, in particular, blue and red parts of the agro spectrum can be added.

2. Indoor plant grow enhancement: The Agro Lamp spectrum is augmented by color-specific LEDs for increasing rate of photosynthesis (Emerson effect), taste or potency of crops. Tailor-made augmenting LEDs may even fertilize plants, control pests and mold, and boost shelf life of fruits and vegetables.

While a number of exemplifying features and embodiments have been discussed above, those of skill in the art will recognize certain modifications, permutations, additions and subcombinations thereof. No limitation with respect to the specific embodiments disclosed herein is intended or should be inferred.

Although the present invention has been described with reference to the disclosed embodiments, numerous modifications and variations including the use of multiple and different wattage HID grow lamps can be made and still the result will come within the scope of the invention. No limitation with respect to the specific embodiments disclosed herein is intended or should be inferred. Each apparatus embodiment described herein has numerous equivalents.

I claim:
1. A grow lamp comprising:
   an upper support frame having a lamp ballast affixed thereto;
   a semi-circular reflector housing affixed under the upper support frame;
   a lamp receptacle affixed inside the semi-circular reflector housing; and
   an auxiliary light panel located adjacent to a lower peripheral edge of the semi-circular reflector housing.
2. The grow lamp of claim 1, wherein the auxiliary light panel has a power supply mounted inside the ballast.

3. The grow lamp of claim 1, wherein the auxiliary light panel has an attachment to a lower peripheral frame on the lower peripheral edge of the semi-circular reflector housing.

4. The grow lamp of claim 3, wherein the attachment further comprises a removable attachment.

5. The grow lamp of claim 1 further comprising a controller to modulate the auxiliary light panel.

6. The grow lamp of claim 1, wherein the auxiliary light panel further comprises at least two separate light sources.

7. The grow lamp of claim 6 further comprising a controller that is programmed to modulate the at least two separate light sources according to a growth stage of a plant.

8. The grow lamp of claim 1, wherein a lamp having a wavelength spectrum is affixed to the lamp receptacle, and the auxiliary light panel has an augmentation light having a selected wavelength spectrum to augment a selected wavelength of the wavelength spectrum of the lamp.

9. The grow lamp of claim 1, wherein the ballast further comprises a daisy chain receptacle.

10. The grow lamp of claim 9, wherein the ballast has a mount on top of the upper support frame.

11. The grow lamp of claim 7, wherein the controller further comprises a wireless receiver functioning to receive a remote command.

12. The grow lamp of claim 1, wherein the semi-circular reflector further comprises a plurality of hinged rectangular subsections running across a longitudinal axis.

13. The grow lamp of claim 8, wherein the augmentation light further comprises a LED.

14. The grow lamp of claim 1, wherein the auxiliary light panel further comprises a downlight LED lamp powered by a power outlet of the ballast.

15. The grow lamp of claim 3 further comprising a water shield removably attached to the auxiliary light panel.

16. The grow lamp of claim 1, wherein the lamp ballast further comprises a solar panel power inlet.

17. An augmentation light frame comprising:
a shape to surround a lower peripheral edge of a grow lamp reflector housing;
a bottom face having a selected augmentation light that enhances a selected wavelength of a grow lamp mounted inside the grow lamp reflector housing; and
a mounting means functioning to secure the augmentation light frame adjacent to the grow lamp reflector housing.

18. The augmentation light frame of claim 17 further comprising a controller to modulate the selected augmentation light in a programmed manner.

19. A method to augment a selected wavelength of a main grow lamp, the method comprising the steps of:
mounting a grow lamp inside an indoor grow facility;
selecting a wavelength of the main grow lamp that needs augmenting;
mounting an augmentation light adjacent the main grow lamp; and
selecting a primary wavelength of the augmentation light, selected from the group consisting of blue, red, far red, UV-A, UV-C, UV-V and infrared, to match the wavelength that needs augmenting.

20. The method of claim 17 further comprising the step of including in the augmentation light a UV-B wavelength.

* * * * *